United States Patent [19]

Nishimura et al.

[11] Patent Number: 4,497,518

[45] Date of Patent: Feb. 5, 1985

[54] ADJUSTABLE SEAT STRUCTURE FOR A MOTOR VEHICLE

[75] Inventors: Shinichi Nishimura, Zama; Yoshinori Akiyama; Yuzo Kanazawa, both of Yokohama, all of Japan

[73] Assignees: Nissan Motor Company, Limited; Ikeda Bussan Co., Ltd., both of Yokohama, Japan

[21] Appl. No.: 333,765

[22] Filed: Dec. 23, 1981

[30] Foreign Application Priority Data

Dec. 26, 1980 [JP] Japan ................................ 55-186286

[51] Int. Cl.$^3$ ............................................... A47C 1/10
[52] U.S. Cl. ..................................... 297/341; 248/393
[58] Field of Search ............... 297/341, 340, 342, 343, 297/344; 248/393, 396, 397

[56] References Cited

U.S. PATENT DOCUMENTS

| 3,940,182 | 2/1976 | Tamura | 297/341 |
| 4,101,169 | 7/1978 | Muraishi et al. | 297/341 |
| 4,143,911 | 3/1979 | Sakakibara | 297/341 |
| 4,159,147 | 6/1979 | Kiyomitsu | 297/341 |

FOREIGN PATENT DOCUMENTS

| 2708423 | 9/1977 | Fed. Rep. of Germany . |
| 2724048 | 12/1978 | Fed. Rep. of Germany ...... 297/341 |
| 2033738 | 5/1980 | United Kingdom ................ 297/341 |

Primary Examiner—James T. McCall
Attorney, Agent, or Firm—Schwartz, Jeffery, Schwaab, Mack, Blumenthal & Koch

[57] ABSTRACT

A seat structure has an improved means for memorizing the seat position which automatically operates a latching means provided on a seat support structure in response to the tilting movement of the seat back.

The seat position memorizing means includes a rotatable plate and means for latching the rotatable plate. The rotatable plate and the latching means are mounted on a base plate of a seat back tilting means, so as to provide a more reliable operation and easy to assemble structure.

11 Claims, 14 Drawing Figures

ADJUSTABLE SEAT STRUCTURE FOR A MOTOR VEHICLE

BACKGROUND OF THE INVENTION

1. Field of the Invention

The present invention relates to an adjustable seat structure for a motor vehicle and more particularly to a seat structure which can move forward to permit easy entry and egress of the rear seat passengers upon forward tilting of the seat back, and automatically latched in the original set position when the seat back is raised upright.

2. Description of the Prior Art

In two door type automobiles, it is usual to provide front seats, the seat back thereof is pivotally movable forward to permit egress and ingress of the passengers of the rear seat of the vehicle.

This front seat is fixed on the vehicle floor by means of an adjustable support structure, and held by means of a latch mechanism provided on the support structure, in one of the selectable seat positions to prevent inadvertent forward or backward movement thereof.

Furthermore, the seat structure is generally equipped with a "seat position memorizing mechanism" for memorizing the originally set position of the seat, associated with the latch mechanism and a seat back tilting mechanism.

Upon forward tiling of the seat back, the latch mechanism is automatically released and the seat structure is allowed to slide forward. With such an advanced seat position, sufficient foot space is provided behind the seat to permit easy egress and ingress of the rear seat passengers.

Upon return movement of the seat back, latching mechanism is actuated by such a seat position memorizing mechanism, and the seat is automatically latched in the original position.

However, since this type of seat has a structure in which the seat position memorizing mechanism is generally placed at a position remote from the seat back tilting mechanism, for example, beneath the seat cushion, it often encounters problems, such that the operation of the seat position memorizing mechanism tends to be inaccurate. On the other hand, a number of steps are required in the manufacturing process of the seat structure due to the increase in number of component parts. In addition, such an arrangement is not suited for the automatic assembly line and it is very difficult to maintain the precise operations of seat position memorizing mechanism and the other adjustable mechanisms of the seat structure during a long term operation.

A more detailed description of the prior art seat structure is made hereinafter with reference to the attached drawings under DETAILED DESCRIPTION OF THE PREFERRED EMBODIMENTS.

SUMMARY OF THE INVENTION

An object of the present invention is to provide a seat position memorizing mechanism which can be easily assembled to an adjustable seat structure, can operate reliably without requiring fine adjustment, does not cause a variation in operation from one assembled seat structure to another, and thus is suited for an automatic assembly line.

According to the present invention, an adjustable seat structure for a motor vehicle having a seat cushion and a seat back, comprises: a seat support structure including a stationary support member, a movable support member slidably mounted on the stationary support member and carrying the seat cushion, and latching means for latching the movable support member on the stationary support member at a selected position of a plurality of selectable positions and allowing a forward movement of the movable support member from the selected position when released; tilting means for allowing the seat back to be tilted relative to the seat cushion, the tilting means including a base plate fixed to the movable support member of the seat support structure and a seat back arm fixedly connected to the seat back and pivotally connected to the base plate to be rotatably supported thereby; sensing means for sensing the rotation of the seat back arm in response to the forward tilting of the seat back; and seat position memorizing means for releasing the latching means in response to the forward tilting of the seat back during a forward movement of the movable support member relative to the stationary member and the subsequent movement until the movable support member returns to the selected position; the sensing means and seat position memorizing means are disposed on the base plate of the tilting mechanism.

DESCRIPTION OF THE PREFERRED EMBODIMENTS

Figure 1:
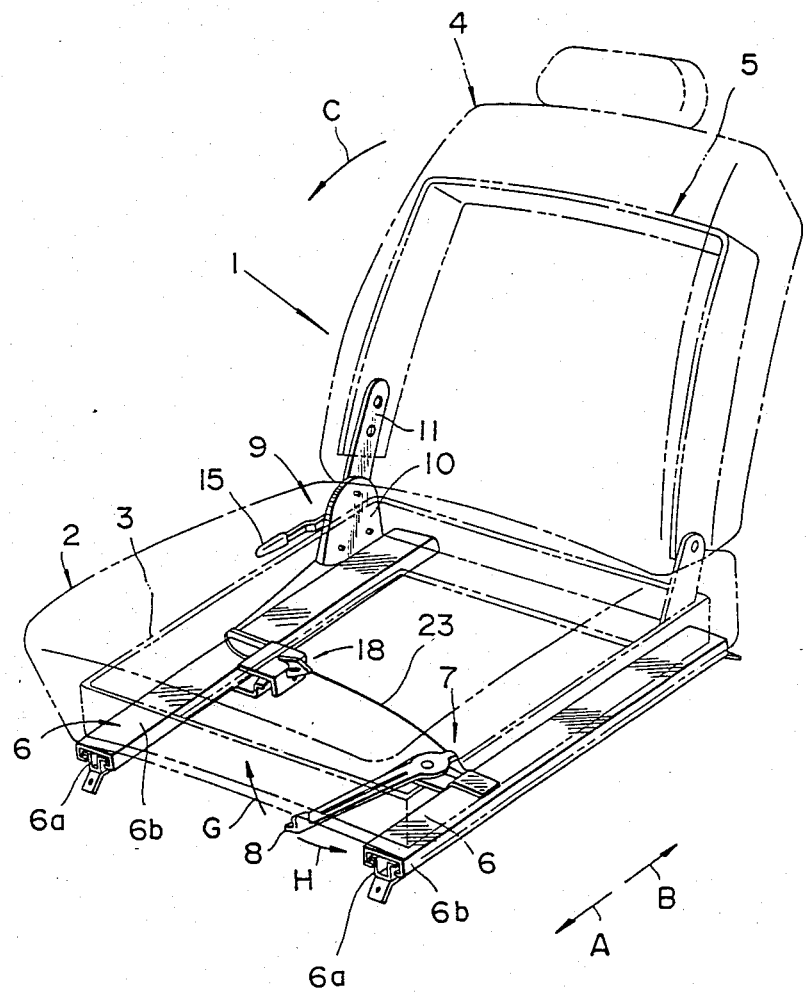
FIG. 1 is a general perspective view of a prior art seat structure.

Before entering into the explanation of the preferred embodiments, an example of the prior art seat structure is explained with reference to FIG. 1 to FIGS. 4A and 4B. In FIG. 1, there is illustrated a seat structure 1 including a seat cushion 2 having a seat cushion frame 3 therein and a seat back 4 having a seat back frame 5 therein. The seat cushion frame 3 is supported by a support structure generally designated by the reference numeral 6 and the seat back frame 5 is secured to the seat cushion frame 3 by means of an adjustable tilting device generally designated by the reference numeral 9.

The support structure 6 includes a pair of elongated stationary support members 6a which are fixed to a floor panel of the vehicle in laterally spaced positions.

A pair of movable support members 6b are connected to the seat cushion frame 3 and slidably carried on the stationary support members 6a for allowing the forward and backward movement of the seat 1 as indicated by arrows A and B.

The seat structure is urged forward by means of a bias spring (not shown) and the support structure 6 is provided with a latching mechanism generally designated by the reference numeral 7 so as to hold the seat at a desired position within the adjustable seat position range.

The latching mechanism 7 comprises a base plate secured on the movable support member 6b, a release lever 8 rotatably mounted on the base plate, and a lock pin which is engageable with one of the plurality of slots arranged lengthwise on the stationary and movable support members 6a and 6b in order to prevent the relative movement thereof when engaged, so as to hold the seat 1 in the position.

The support structure 6 is also provided with a seat position memorizing mechanism 18 for automatically operating the latching mechanism 7 via a connecting wire 23 upon forward tilting as indicated by an arrow C and return movement of the seat back 4.

The seat back 4 is swingably supported at the rear end of the seat cushion 3 by means of a tilting mechanism generally designated by the reference numeral 9 which connects the seat sushion frame 3 and the sear back frame 5.

Figure 2:
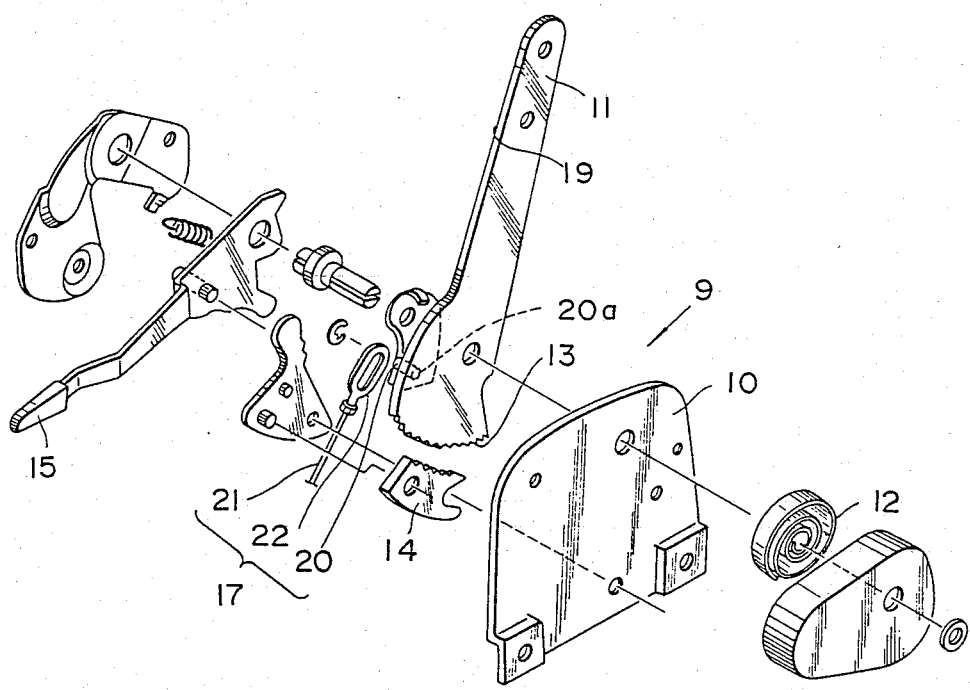
FIG. 2 is an exploded view of a prior art tilting mechanism especially showing the arrangement of the sensing means shown in FIG. 1.

Referring to FIG. 2, the tilting mechanism comprises a base plate 10 which is fixed to a rear end side face of the seat cushion frame 3 as is well shown in FIG. 1. A seat back arm 11 having a toothed portion at the lower end thereof is fixedly connected to the seat back frame 5 and pivotally supported by the base plate 10. The seat back arm 11 is forced by a spiral spring 12 in a counter clockwise direction for allowing the forward tilting of the seat back 4.

In order to hold the seat back at a selected position, a stop plate 14 having a toothed edges engagable with the toothed portion of the arm 11 is provided beneath the seat back arm 11, and the engagement therebetween is operated by a handle 15.

A sensing device 17 for sensing the forward tilting of the seat back is also incorporated in this tilting mechanism 9. The sensing device 17 comprises a plate member 20 coaxially disposed with the seat back arm 11 and rotatable in the counter clockwise direction when the seat back is tilted forward.

At the lower end side face of the plate member 20, there is provided a pin 20a for loosely engaging with an elongated annular terminal 22 of the connecting wire 21 which leads to the seat position memorizing mechanism 18 described hereinafter.

Figure 3:
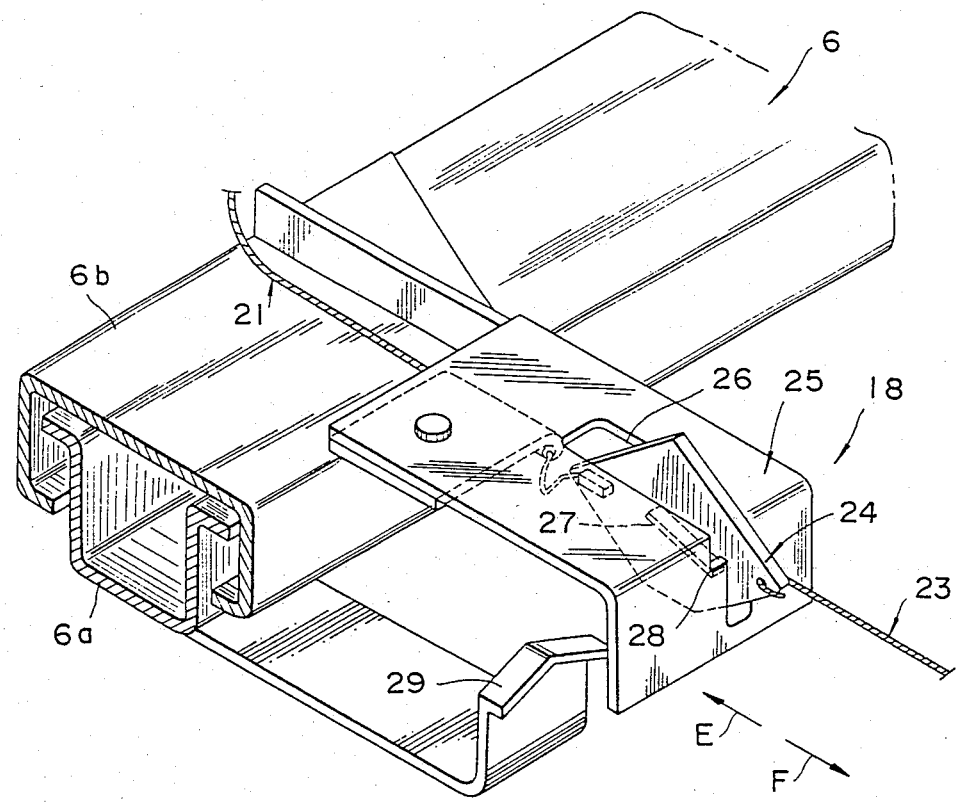
FIG. 3 is a perspective view of a prior art seat position memorizing mechanism.

As shown in FIG. 3, the seat position memorizing mechanism 18 comprises a generally L shaped bracket 25 fixedly connected to the movable support member 6b of the support structure 6, and a shift plate 24 received in a generally rectangular guide slot 26 formed in the bracket 25. The shift plate 24 is maintained uprightly in this guide slot 26 and laterally displaceable with the operation of tilting mechanism 9. Each end of the shift plate is respectively connected the connecting wire 21 leads to the sensing device 17 and a connecting wire 23 leads to an end of the release lever 8 of the latching mechanism 7.

A stoper plate 27 is provided on the side face of the shift member 24 slightly inclined to the horizontal axis, and the width of the lower portion of the guide slot 26 is reduced to form an abutment wall which is engagable with an end of the stop member 27 when the shift plate 24 moves rightward.

Further, a pusher member 29 is provided on the stationary support member 6b of the support structure 6 and which comes into contact with the bottom edge of the shift plate 24 in order to push it up when the bracket member 26 passes thereover during the forward or backward slide movement of the seat structure 1.

Figure 4A:
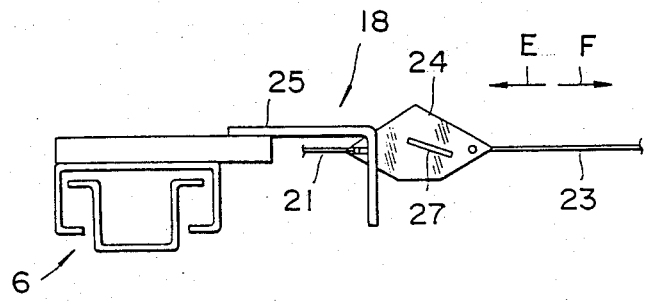
FIGS. 4A and 4B are explanatory views of the operation of the seat position memorizing mechanism, showing the position of a shift plate relative a bracket.

Usually, when the seat back is held upright, the shift plate 24 is pulled by the connecting wire 23 rightward as shown by the arrow F, and located outside of the guide slot 26 of the bracket member 25 as shown in FIG. 4A. With this displaced position of the shift plate 24, the latching mechanism 7 is maintained at its latched position.

Figure 4B:
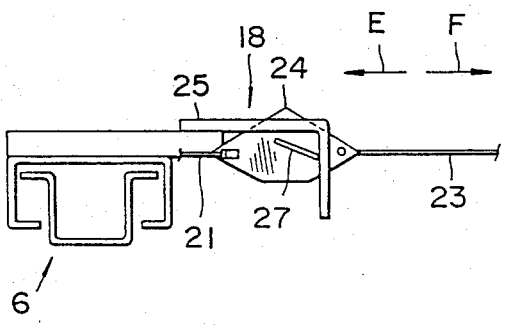

When the seat back is tilted forward, the arm 11 rotates in the counter clockwise direction, and the plate 20 also rotates to pull the terminal 22 of the connecting wire 21 by the pin 20a. In accordance with the movement of the connecting wire 21, the shift plate 24 is moved leftward as indicated by the arrow E, and located substantially within the guide slot 26 of the bracket member 25 as shown in FIG. 4(B).

The movement of the shift plate 24 causes the actuation of the release lever 8 of the latching mechanism 7 through the connecting wire 23, and consequently causes the disengagement of the latching means 7 to permit the forward movement of the seat structure 1 in accordance with the tension from the bias spring.

Upon this leftward movement of the shift plate 24, the stopper member 27 easily passes over the abutment wall of the bracket 25, thanks to the inclined arrangement of the stopper member 27.

When the seat back is returned to the normally upright position, the plate member 20 rotates clockwisely to release the tight engagement between the pin 20a and the terminal of the connecting wire 22. Therefore, the shift plate is no more applied with a tension from the connecting wire 21. However, in this state, the shift plate is held in that position due to the abutment between an end of the stopper member 27 and the abutment wall of the bracket 25.

During the seat is moving backward against the bias force, when the top end of the pusher member 29 contacts with the bottom end of the shift plate, the pusher plate 29 pushes up the shift plate 24 to cause the disengagement of the stopper member 27 and the abutment wall of the bracket 25.

As a result, the shift plate 24 is allowed to move rightward to actuate the latching mechanism 7.

Thus, the seat is automatically fixed at the set position by means of the latching mechanism 7.

This prior art seat position memorizing mechanism, however, has the aforementioned problem of inaccuracy of operation or low reliability, since the shift plate 24 is only suspended by the connection wires 21 and 23.

and therefore it is very difficult to maintain the position of the shift plate 24 precisely for operating the seat position memorizing mechanism properly.

In addition, an accurate adjustment of length of the connecting wire during the assembling process is needed.

The present invention is explained with reference to FIGS. 5 to 8 of the accompanying drawings.

In the following description, the explanation of the general construction of the seat structure is eliminated since it is almost the same as that of the prior art seat structure shown in FIGS. 1 and 2.

Figure 5:
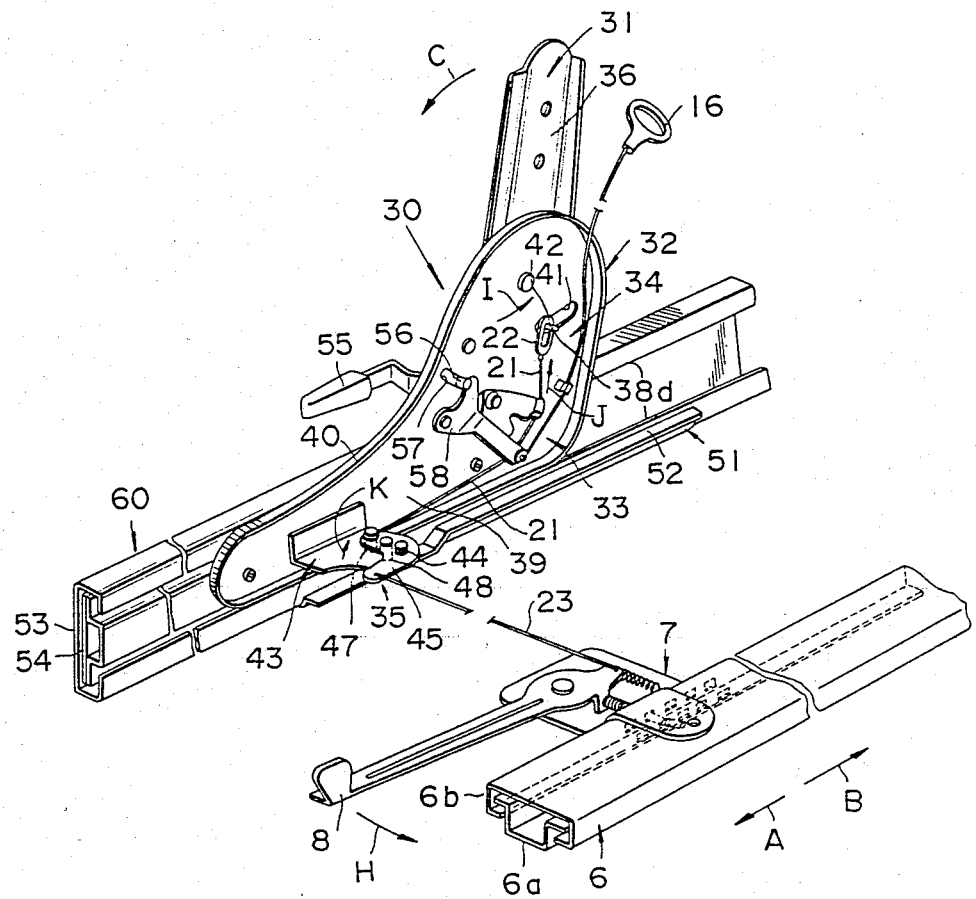
FIG. 5 is a perspective view of a first embodiment of the seat structure according to the present invention especially showing the construction of the seat position memorizing mechanism.

FIG. 5 is a fragumentally perspective view showing the adjustable mechanisms of a first embodiment of the seat structure according to the present invention, in which like reference numerals in FIGS. 1 to 4 are used for designating corresponding elements. In the figure, a seat back tilting device generally designated by the reference numeral 30 is fixedly mounted on the movable support member of a seat support structure 60, in the form of a seat side rail member 54 slidably received in the stationary support member in the form of a body side rail member 53. A latching mechanism 7 is provided on the movable support member 6b of opposite side seat structure 6.

The tilting device 30 comprises a base plate 32 fixedly mounted on the rail member 54 and a seat back arm 31 pivotally mounted on the base plate 32. As clearly shown in FIG. 6, the seat back arm 31 is made up by a plate member 36 having flange portions at each side thereof and a member formed by a forging process with a toothed portion 37 having a plurality of teeth 13 at the lower end thereof and these elements are fixedly connected by a plurality of caulking pins 38a to 38d.

The base plate 32 has a forwardly extending portion 39 at the lower half portion thereof and a flange 40 directed into the inner surface 33 is formed throughout the outer periphery thereof.

In order to sense the rotational movement of the seat back arm 31, one 38d of the caulking pins is extended into the inner surface 33 of the base plate 32 through a slot 41 for limitting the rotational range of the seat back arm 31. Similar to the tilting mechanism of the prior art seat structure, an elongated annular terminal 22 of a connecting wire 21 is loosely engaged at the top end 42 of the caulking pin 38d to form a sensing device generally designated by the referece numeral 34. As shown in FIG. 5, a control lever 55 and a release hook 16 are further provided on the base plate 32 for operating the tilting mechanism 30. The control lever 55 has a stud 56 which projects through the slot 57 formed in the base plate 32 and the release hook 16 is operatively connected with the control lever 55 by the abutment between the stud 56 and a release arm 58 rotatably disposed on the base plate 32.

The base plate 32 is also used for carrying a seat position memorizing mechanism generally designated by the reference numeral 35 which is operatively connected to the sensing device 34 and the latching mechanism 7 of the support structure by means of the connecting wires 21 and 23 respectively.

As shown in FIG. 5, the memory mechanism 35 comprises a bracket 43 securely disposed on the forward extending portion 39 of the base plate 32 and a generally L shaped plate member 45 pivotally mounted on the bracket 43 about a shaft 44. The plate member 45 is provided with a memory pin 47 at an end portion thereof and a pusher pin 48 in the vicinity of the center of the pivot movement, which are fixedly connected to the plate member 45. The pusher pin 48 projects downwardly through an arched slot 50 formed in the bracket member 43 to restrict the rotatable range of the plate member 45. The memory pin 47 is engagable within an arched slot 49 formed in the bracket member 43 when the plate member 45 is rotated and at a clockwisely displaced position.

Furthermore, the plate member 45 is urged downwardly by a coil spring 46 which is coaxially mounted on the pivot shaft 44 and an elongated pusher member 51 having an upper contact surface 52, is securely disposed on the stationary support member i.e., the body side slide rail 53 of the seat support structure 60.

A terminal 211 of the connecting wire 21 is engaged on the top end 471 of the memory pin 47 and an extremity 231 of the connecting wire 23 which leads to the release lever 8 of the latching mechanism 7 is engaged with the other end of the plate member 45 so that the tension of the connecting wire 21 is transmitted to the connecting wire 23 via the plate member 45 when the seat back 4 is tilted forward.

The operation of this seat position memorizing mechanism is then explained with reference to FIGS. 5 to 8A and 8B.

When the control lever 55 or the release hook 16 is operated to tilt the seat back forward, i.e., upon the rotation of the seat back arm 31 in the counter clockwise direction shown by the arrow C in FIG. 5, the caulking pin 38d connected to the arm 31 also rotates in the counter clockwise direction as shown by the arrow I in FIG. 5 and pulls the terminal 22 of the connecting wire 21 shown by the arrow J. Consequently, the plate member 45 rotates in the clockwise direction as shown by the arrow k to pull the connecting wire 23 and releases the latching mechanism 7 disposed on the seat support structure 6.

In this case, the memory pin 47 of the plate member 45 slides over the upper surface of the bracket 43 and is finally received within the elongated latch slot 49.

After releasing the latching mechanism 7, the seat is automatically moved forward in accordance with the resilient force of the bias spring (not shown).

Nextly, when the seat back is moved back to the upright position, the arm 31 is rotated in the reverse direction of the arrow C. In this state, however, the terminal 22 of the connecting wire 21 does not follow the movement of the caulking pin 38d since the plate member 45 of the seat position memorizing mechanism is latched in the clockwisely displaced position by the engagement between the memory pin 47 and the latch slot 49 as clearly shown in FIG. 8A and therefore the latching mechanism 7 remains released.

When the seat back is pushed back against the resilient force of the bias spring, the seat moves backward.

Then, when the seat is at an intermediate portion of the slidable range of the seat structure at which the pusher member 51 is placed, the lower end of the pusher pin 48 is pushed up by the upper contact surface 52 of the pusher member 51 and the plate member 45 is raised up against the resilient force of the coil spring 46 and the memory pin 47 is released from the latch slot 49 as shown in FIG. 8B.

After that, the plate member 45 is allowed to rotate in the counter clockwise direction in accordance with the tension from the connecting wire 23 so as to release the release lever 8 of the latching mechanism 7 to cause the latch engaging operation of the latching mechanism 7.

Thus, the seat is held by the latching mechanism 7 at the intermediate position of the slidable range.

Figure 6:
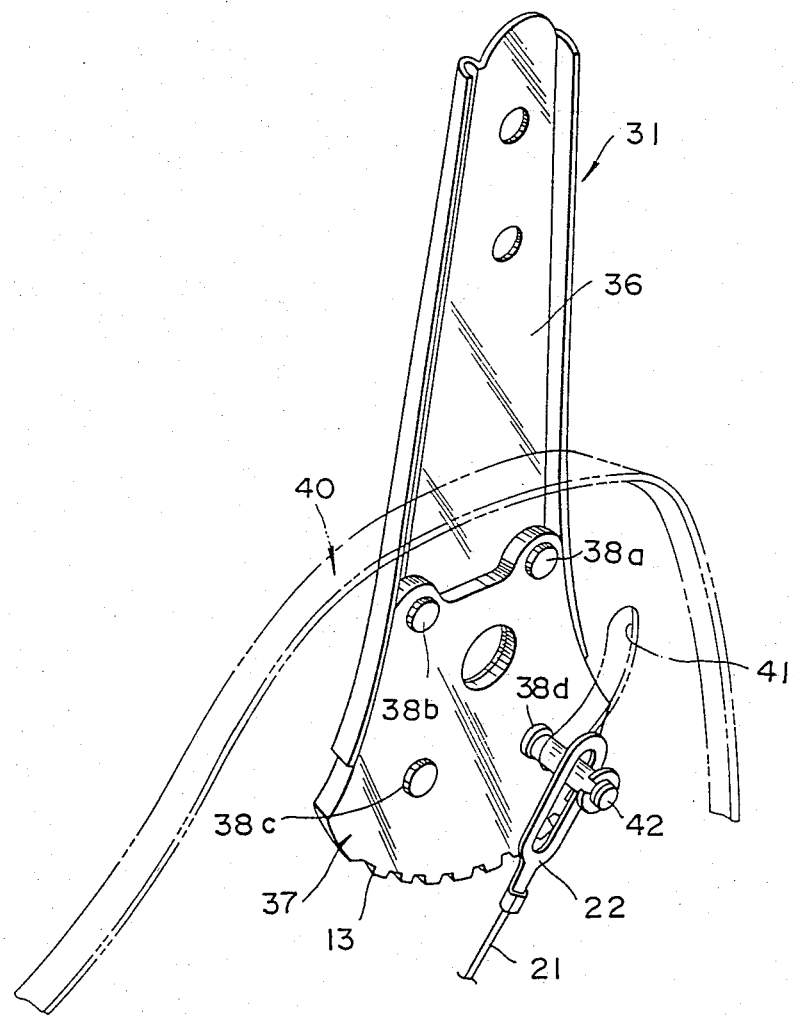
FIG. 6 is an enlarged perspective view of the seat back tilting mechanism of the first embodiment, especially showing the manner in which the terminal of the connecting wire is engaged with the seat back arm.
Figure 7:
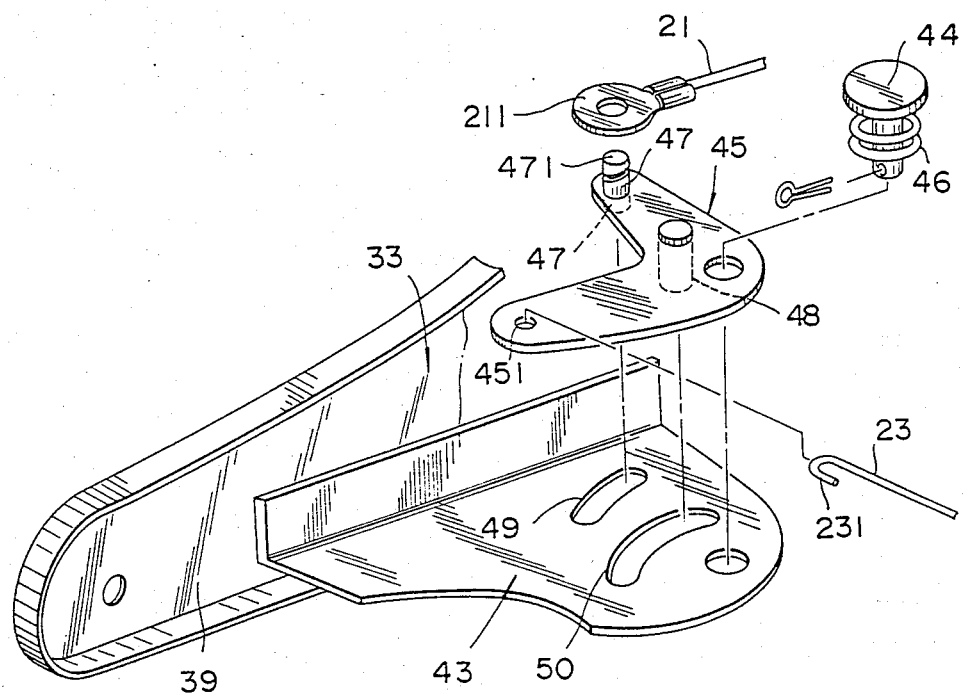
FIG. 7 is an exploded view of the seat position memorizing means.
Figure 8:
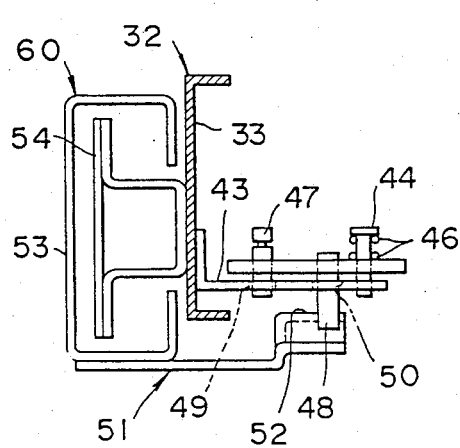
FIGS. 8A and 8B are front views of the seat position memorizing means respectively showing the rotatable plate member at latched and released positions.
Figure 8:
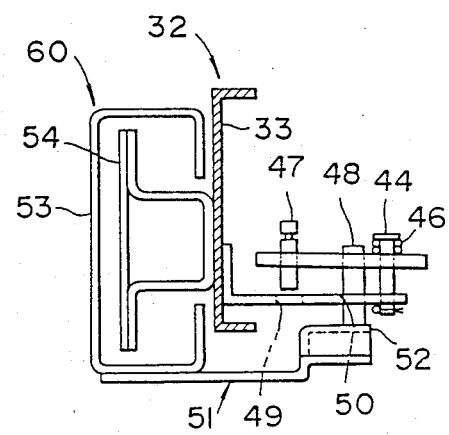

Needless to say, the seat back arm 31 can be made of one piece member, and in such a case, a suitable element for the engagement with the terminal 22 of the connecting wire 21 may be provided on the seat back arm 31 in place of the extended caulking pin 38d. In addition, the arrangement of the seat support structure is not limited to the uprightly arranged slide rails 53 and 54 as shown in FIG. 6, and various configurations of the support structure may be used.

Figure 9:
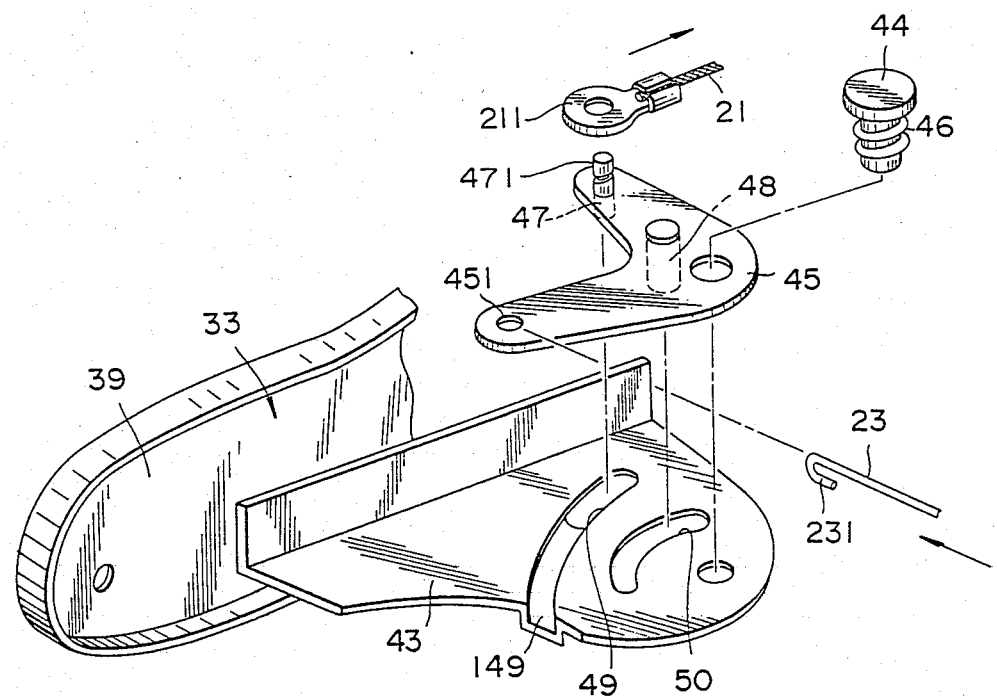
FIG. 9 is an exploded perspective view of the seat position memorizing mechanism of a second embodiment of the present invention.
Figure 10:
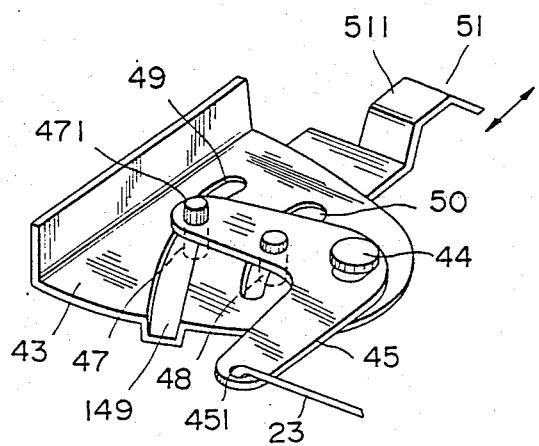
FIG. 10 is a perspective view of the seat position memorizing mechanism similar to FIG. 9, while showing the assembled state.

Turning to FIGS. 9 to 10, a second embodiment of the present invention is explained.

FIG. 9 is a fragmentally perspective view of the arrangement of the seat position memorizing mechanism of the second embodiment.

This seat position memorizing mechanism features an arched channel 149 which leads to the latch slot 49 formed in the bracket 43 in order to facilitate the introduction of the memory pin 47 into the latch slot 49. The depth of the guide channel 149 is sufficient for allowing the lower end of memory pin 47 entering thereinto at the peripheral portion of the bracket 43 and is gradually decreased into the latch slot 49.

FIG. 10 is perspective view of this seat position memorizing mechanism in which the plate member 45 is in the latched position.

Figure 11:
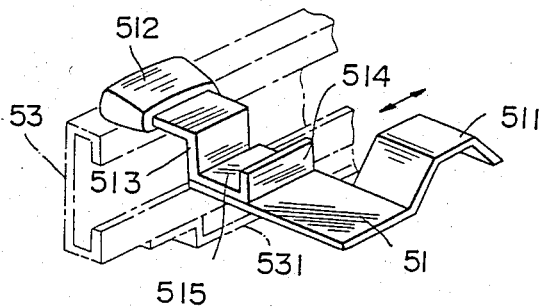
FIG. 11 is a perspective view of the pusher member of a third embodiment of the present invention.
Figure 12:
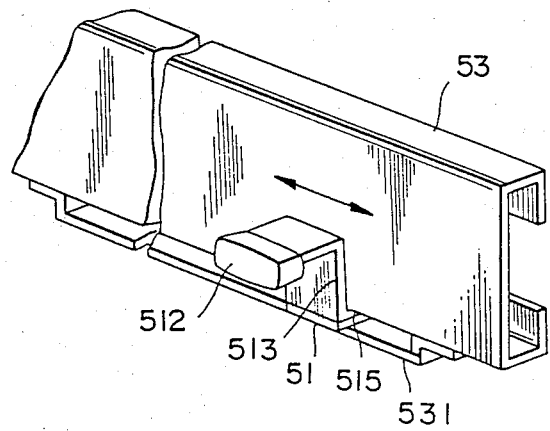
FIG. 12 is a perspective view of the pusher member similar to FIG. 11, white taken from the outside of the seat support structure.

Referring to FIGS. 11 and 12, a third embodiment of the present invention is explained. The third embodiment features the pusher member 51 being slidably mounted on the body side rail member 53 of the seat support structure for enabling the adjustment of the position at which the seat is automatically latched by means of the seat position memorizing mechanism 35.

As clearly shown in FIG. 11, the pusher member 51 is provided with a generally trapizoidal pusher portion 511 at the inner end thereof and a control knob 512 at the outer end thereof for the manual operation of the pusher member 51 into a desired position within an adjustable range. As shown in FIG. 11, the pusher member 51 has a folded portion 513 and flange portion 514 to form a generally C shaped groove 515 by which the pusher member 51 is slidably received in the guide slot formed between the lower face of the rail member 53 and an elongated support member 513 connected thereto. Furthermore, a frictional surface is formed in the groove 515 so that the pusher member 51 is maintained at the selected position when the pusher member contacts the lower end of the pusher pin 48.

It is to be noted that, in the case of this third embodiment, there is a further advantage that the seat can be held at any position by means of the latching mechanism only by the manual operation of the pusher member instead of changing the seat position which otherwise is required for actuating the latching mechanism.

While the invention is described in its prefered form shown in FIGS. 5 to 12, many variation and modification is possible in light of above teachings.

For example, a suitable link mechanism can be used instead of the connecting wires 21 and 23 for transmitting the movement of the seat back into the latching mechanism of the seat support structure. In addition, the memory pin 47 of the seat position memorizing mechanism can be provided on the bracket 43. In such a case, it is sufficient to provide a latch slot on the plate member 45 cooperative with the memorizing pin 47, for realizing the same operation.

Further more the sensing device 34 associated with the tilting mechanism can be constructed to sense also the backward tilting of the seat back, so that the latching mechanism of the seat support structure is actuated when the seat deck is tilted backward by a predetermined tilting angle.

Moreover, it is possible to provide the pusher member 51 with a locking means for preventing an undesirable movement thereof.

What is claimed is:

1. An adjustable seat structure for a motor vehicle having a seat cushion and a seat back, comprising:
    a seat support structure including a stationary support member, a movable support member slidably mounted on said stationary support member and carrying the seat cushion, and latching means for latching said movable support member on said stationary support member at a selected position of a plurality of selectable positions and allowing a forward movement of said movable support member from said selected position when released;
    a base plate fixed to said movable support member of said seat support structure;
    tilting means for allowing the seat back to be tilted relative to the seat cushion, said tilting means including a seat back arm fixedly connected to the seat back and pivotally connected to said base plate and rotatably supported thereby;
    sensing means disposed on said base plate for sensing the rotation of said seat back arm in response to the forward tilting of the seat back; and
    latch release means disposed on said base plate for releasing said latching means in response to the forward tilting of the seat back during a forward movement of said movable support member relative to said stationary member and the subsequent movement until said movable support member returns to said selected position.

2. An adjustable seat structure as claimed in claim 1, wherein said base plate has a forwardly extending portion, said latch release means being secured on said forwardly extending portion.

3. An adjustable seat structure as claimed in claim 1, wherein said latch release means comprises:
    a plate member pivotally disposed on a bracket fixed to said base plate and rotatably movable between a normal position and an angularly displaced position;
    a first power transmitting device connected between said sensing means and said plate member for converting the tilting movement of said seat back arm into a rotary motion of said plate member;
    a second power transmitting device connected between said plate member and said latching means for transmitting the rotary motion of said plate member to said latching means; said second transmitting device releasing the latch engagement of said latching means when said plate member is in said angularly displaced position;
    latch engaging means for latching said plate member at the angularly displaced position; and
    plate member releasing means disposed on said stationary support member for releasing said plate member from said angularly displaced position when said movable support member returns to said selected position after the backward movement subsequent to the forward movement from said selected position, wherein one of said plate member and said bracket is provided with an arched latch slot and the other one of said plate member and said bracket is provided with a pin member engageable with said latch slot when the plate member is positioned at the angularly displaced position, and wherein said plate member releasing means has a pusher surface contactable with a portion of the plate member in order to shift the same along an axis of pivot movement thereof so as to disengage said pin member from said latch slot.

4. An adjustable seat structure as claimed in claim 3, wherein said one of the plate member and the bracket is provided with a guide channel leading to the latch slot, thereby facilitating the introduction of said pin member into the latch slot.

5. An adjustable seat structure as claimed in claim 3, wherein said plate member is provided with a projection member which projects through an opening formed in said bracket and is contactable with the pusher member when the seat is moved to a predetermined position, to cause disengagement of the pin member from said latch slot by a shift motion of said plate member along the pivot axis thereof.

6. An adjustable seat structure as claimed in claim 3, wherein said plate member releasing means comprises a pusher member slidably disposed on said stationary support member so that a position of the pusher member corresponding to said selected position of said movable support member in which the latching means of the seat support structure is actuated is desirably adjusted.

7. An adjustable seat structure as claimed in claim 6, wherein said pusher member is formed with a frictional surface contactable with the stationary support member so as to prevent an undesirable sliding movement thereof.

8. In a vehicle:
a seat having a seat portion and a backrest portion tiltably mounted on said seat portion via a tilting mechanism;
a guide rail on which said seat portion is slidably mounted;
a latch mechanism for selectively locking said seat portion to said guide rail; and
a seat position memory device comprising:
a bracket attached to said seat portion;
a lever which is mounted on said bracket so as to be pivotal about an axis, said lever being operatively connected with said latch mechanism and biased in a first direction along said axis toward said bracket by a spring;
means for rotating said lever about said axis in a first rotational direction toward a first position wherein said latch mechanism is released and said seat is permitted to slide along said guide rail in a first direction in response to said seat back being tilted to permit passenger ingress or egress;
means for interconnecting said lever and said bracket and holding said lever in said first position;
means responsive to said seat being moved in a second direction along said guide rail to a preselected position, for pushing said lever in a second direction against the bias of said spring to a position spaced from said bracket at which said lever is released from said securing means and is permitted to rotate away from said first position toward a second position wherein said latch mechanism is permitted to lock said seat to said guide rail.

9. A memory device as claimed in claim 8, further comprising a base plate, said base plate supporting said tilting mechanism, said bracket, said rotating means and said interconnecting means thereon.

10. A memory device as claimed in claim 9, wherein said interconnecting means takes the form of a projection extending from one of said lever and said bracket; and a slot formed in the other of said lever and said bracket, said extension being arranged to enter said slot upon said lever being rotated to said first position and be retained therein until said lever is pushed away from said bracket against the bias of said spring by said pushing means and assume a position a predetermined distance from said bracket.

11. A memory device as claimed in claim 8, wherein said pushing means take the form of a projection which extends from said lever and which is engageable with a contact surface and which urges said lever against the bias of said spring upon contacting said contact surface.

* * * * *